US007848528B2

(12) United States Patent
Kargus, IV et al.

(10) Patent No.: US 7,848,528 B2
(45) Date of Patent: Dec. 7, 2010

(54) HANDS-FREE MICROPHONE WITH WIND BREAK

(75) Inventors: Walter A. Kargus, IV, Livonia, MI (US); Kevin T. Moss, Saint Clair, MI (US)

(73) Assignee: General Motors LLC, Detroit, MI (US)

(*) Notice: Subject to any disclaimer, the term of this patent is extended or adjusted under 35 U.S.C. 154(b) by 1229 days.

(21) Appl. No.: 11/412,653

(22) Filed: Apr. 27, 2006

(65) Prior Publication Data

US 2006/0193486 A1 Aug. 31, 2006

Related U.S. Application Data

(63) Continuation-in-part of application No. 10/893,478, filed on Jul. 16, 2004, now Pat. No. 7,369,664.

(51) Int. Cl.
*H04B 1/00* (2006.01)
*H04R 9/08* (2006.01)

(52) U.S. Cl. ........................................ 381/86; 381/365

(58) Field of Classification Search .................. 381/86, 381/359, 364, 365, 372; 181/205
See application file for complete search history.

(56) References Cited

PUBLICATIONS

U.S. Appl. No. 11/345,967, filed Feb. 2, 2006, Kargus.
U.S. Appl. No. 10/850,303, filed Jul. 16, 2004, Kargus et al.
AKG Acoustics, A Harman International Company, Q500 Series, Q501T WS, Amplified Version With Improved Wind Screen, V2. May 1, 2004.

*Primary Examiner*—Brian Ensey
(74) *Attorney, Agent, or Firm*—Anthony L. Simon; Reising Ethington P.C.

(57) ABSTRACT

A wind break device for a microphone includes an airflow diverter and a flow separation edge partially bordering a microphone end of the airflow diverter. The microphone zone located between the flow separation edge and is part of the recirculation zone. The microphone is located in the microphone zone. Airflow separates from one of the airflow diverter or the flow separation edge. The separated airflow is directed as one of recirculating airflow or a major airflow and the recirculating airflow is directed into the recirculation zone. The major airflow is directed over the microphone zone and the recirculation zone to reduce the level of pressure fluctuations experienced by the microphone in the microphone zone.

19 Claims, 10 Drawing Sheets

HANDS-FREE MICROPHONE WITH WIND BREAK

This is a continuation-in-part application of application Ser. No. 10/893,478 filed on Jul. 16, 2004 now U.S. Pat. No. 7,369,664, the entirety of which is incorporated by reference.

FIELD OF THE INVENTION

This invention relates generally to microphonic transducer systems, and more specifically to wind break for hands-free microphones in mobile vehicles.

BACKGROUND OF THE INVENTION

Automobile manufacturers and designers have focused on airflow smoothening and efficient sound-insulating methods for reducing noise in the vehicle cabin. Noise sources such as the wind, turbulence, and pressure fluctuations can excite the vehicle body and transmit noise into the car cabin. Other inherent noises of the automotive environment include tire and engine noise, as well as voices of other passengers. Fans and blowers of the heating, ventilation, and air conditioning systems generate noise and local pressure variations in the forced air stream.

Besides being interested in finding ways to reduce the generation of turbulence, automotive manufacturers recognize the need to reduce the influence of the air pressure fluctuations inside a vehicle cabin upon various audio components such as a microphone of an in-vehicle cellular phone or a voice-recognition system.

Some automobile microphone systems use electronic processing, multiple microphones, or both to reduce the influence of the pressure fluctuations. These microphones can be located on rear-view mirrors, headliners, overhead consoles or steering columns.

In one example, an in-vehicle microphone system located in an overhead console picks up the driver's voice and uses algorithms in its electronic processing to reduce the influence of pressure fluctuations and reduce background noise. This electronic processing helps improve the transmission quality of the driver's speech.

In another example, a self-contained digital-signal-processing (DSP) microphone system uses a digital microphone array and software algorithms to help reduce issues with voice recognition and audio intelligibility common in high noise, automotive environments.

Microphone systems for vehicles would be improved if the influence of airflow within the cabin was reduced and the system did not require multiple microphones or signal-processing software to electronically reduce the influence of pressure fluctuations produced by in-vehicle airflow, thereby increasing the signal-to-noise ratio and improving the fidelity of the microphonic pickups to improve clarity of speech. Therefore, an improved in-vehicle microphone system provides clearer voice recognition, increases speaker intelligibility, enhances other noise reduction techniques, and reduces packaging complexity, circuitry and costs, while reducing the influence of airflow on the microphone system.

SUMMARY OF THE INVENTION

A first aspect of the present invention is a wind break device for a microphone, the wind break device including an airflow diverter and a flow separation edge which partially borders a recirculation zone of the airflow diverter. The recirculation zone contains the microphone zone. The microphone is located in the microphone zone. Airflow separates from one of the airflow diverter or the flow separation edge. The separated airflow is directed as one of recirculating airflow or a major airflow. The recirculating airflow is directed into the recirculation zone. The major airflow is directed over the microphone zone and the recirculation zone to reduce the level of pressure fluctuations experienced by the microphone in the microphone zone.

A second aspect of the present invention is an acoustic reception system for a mobile vehicle. The system includes a microphone connected to an in-vehicle communication device and a wind break device. The wind break device includes an airflow diverter and a flow separation edge which partially borders a recirculation zone of the airflow diverter. The recirculation zone contains the microphone zone. The microphone is located in the microphone zone. Airflow separates from one of the airflow diverter or the flow separation edge. The separated airflow is directed as one of recirculating airflow or a major airflow. The recirculating airflow is directed into the recirculation zone. The major airflow is directed over the microphone zone and the recirculation zone to reduce the level of pressure fluctuations experienced by the microphone in the microphone zone.

A third aspect of the present invention is a hands-free communication device including a headset having at least one earphone and a microphone. The hands-free communication device includes a wind break device. The wind break device includes an airflow diverter and a flow separation edge which partially borders a recirculation zone of the airflow diverter. The recirculation zone contains the a microphone zone. The microphone is located in the microphone zone. Airflow separates from one of the airflow diverter or the flow separation edge. The separated airflow is directed as one of recirculating airflow or a major airflow. The recirculating airflow is directed into the recirculation zone. The major airflow is directed over the microphone zone and the recirculation zone to reduce the level of pressure fluctuations experienced by the microphone in the microphone zone.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, in which like references indicate similar elements, and in which.

DETAILED DESCRIPTION OF THE PRESENTLY PREFERRED EMBODIMENTS

Figure 1A:
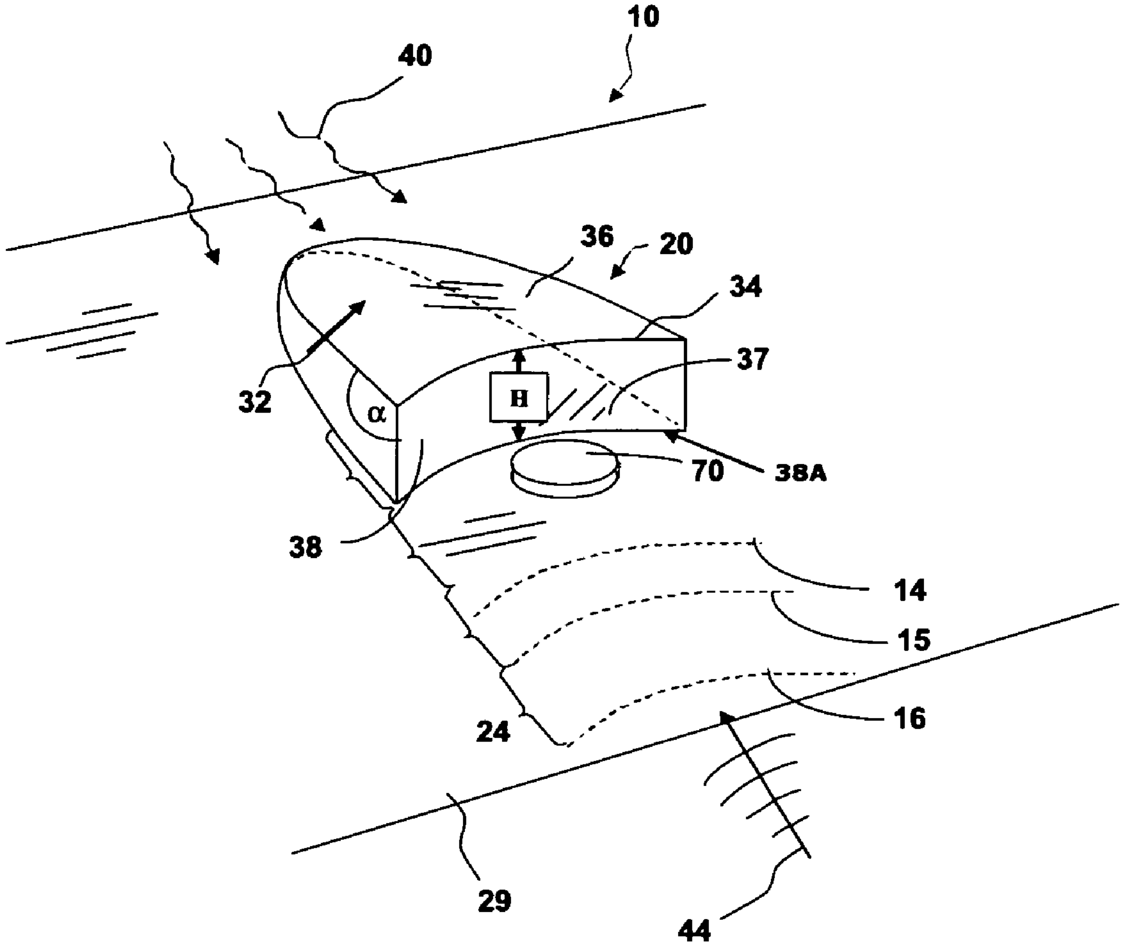
FIG. 1A illustrates an oblique view of an wind break for a microphone, in accordance with a first embodiment of the invention.
Figure 1B:
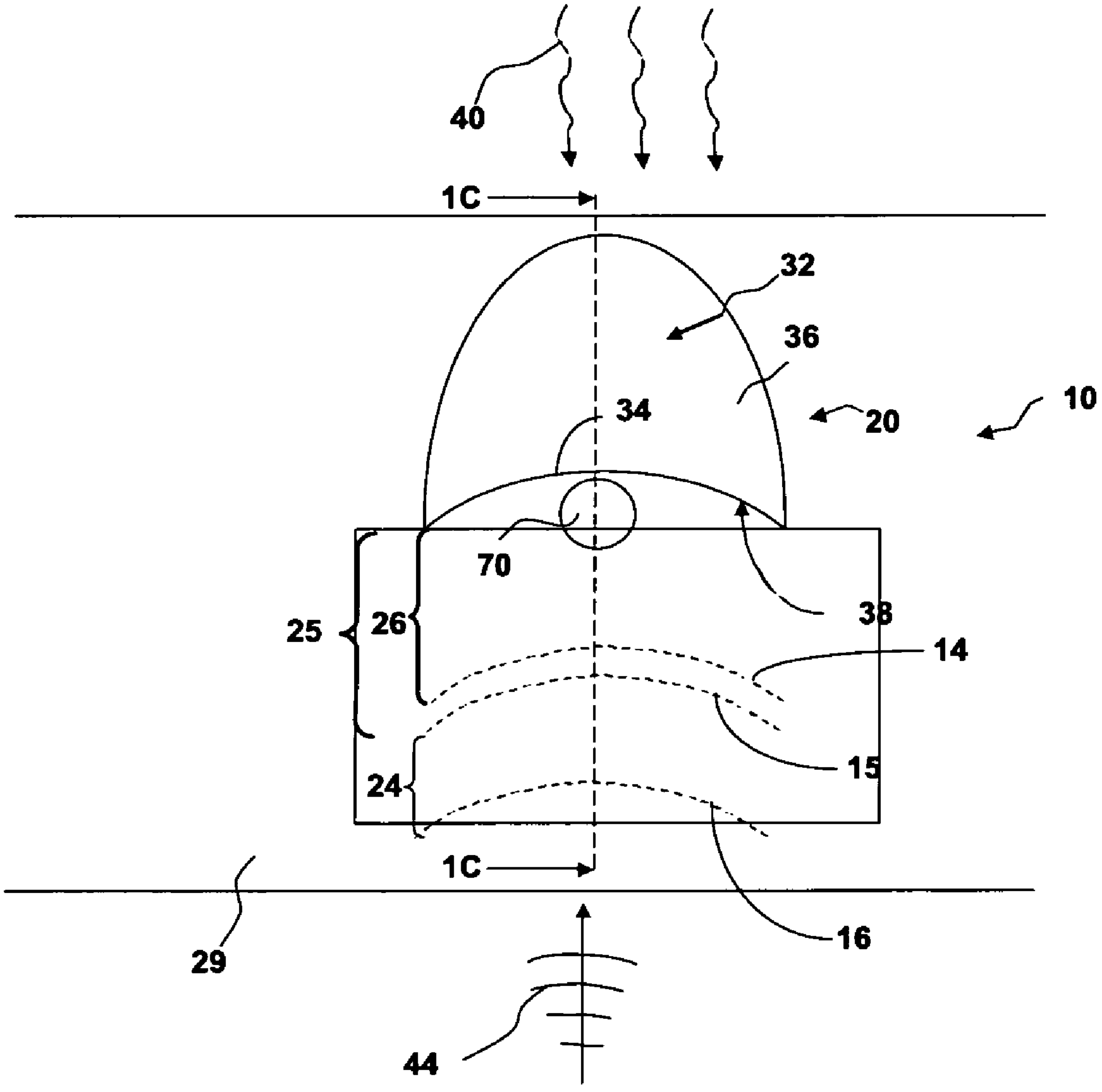
FIG. 1B illustrates a top view of the wind break for a microphone, in accordance with the first embodiment of the invention.
Figure 1C:
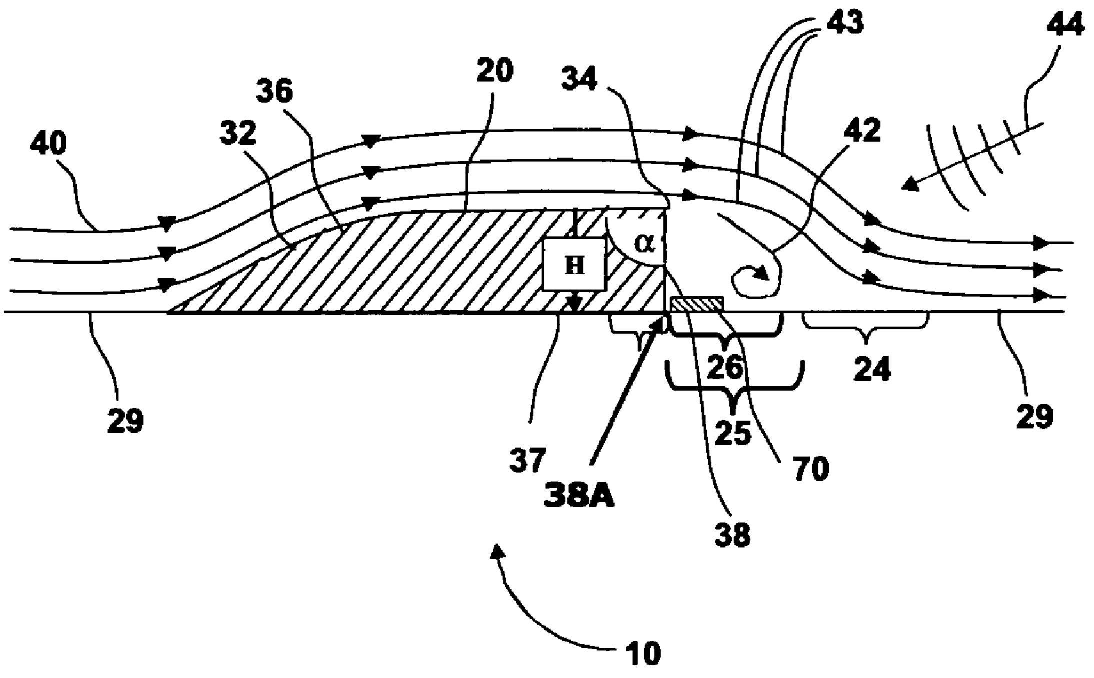
FIG. 1C shows a cross-sectional side view of airflow over the wind break for a microphone, in accordance with the first embodiment of the invention.

FIG. 1A illustrates an oblique view of a wind break device 20 for a microphone 70, in accordance with a first embodiment of the invention. FIG. 1B illustrates a top view of the wind break device 20 for the microphone 70, in accordance with the first embodiment of the invention. FIG. 1C shows a cross-sectional side view of airflow 40 over the wind break device 20 for a microphone 70, in accordance with the first embodiment of the invention. The plane upon which the cross-section view of FIG. 1C is taken is indicated by section line 1C-1C in FIG. 1B.

An acoustic reception system 10 includes a microphone 70 and a wind break device 20 for the microphone 70. The wind break device 20 has an airflow diverter 32 and a flow separation edge 34. The flow separation edge 34 is positioned downstream of the wind break device 20.

The body portion of wind break device 20 includes a contoured surface 36 having a flow separation edge 34, a lower surface 29 offset from the contoured surface 36 by a height H (FIG. 1) and a front face 38 bordered by the flow separation edge 34 and bordered at a second edge 38A by the lower surface 29. In this embodiment, the front face 38 wind break device 20 is curved. The wind break device 20 includes a contoured outer surface 36 to direct the airflow away from the microphone 70. The surface of the wind break device 20 is contoured as shown by contoured outer surface 36. Contoured outer surface 36 includes a variety of radii and the radii of the contoured outer surface 36 extends from the end upon which the airflow 40 is incident to the front face 38. The flow separation edge 34 is the apex of an angle $\alpha$ between the front face 38 and the contoured outer surface 36. Angle $\alpha$ is configured to increase the ability of the flow to stay separated from the surface. The angle $\alpha$ has a range from about 0 degrees to about 180 degrees. In one embodiment, angle $\alpha$ is between 70 and 110 degrees. Contoured outer surface 36 may have a variety of shapes such as a cone shape, a half-cone shape, a wedge shape, a tapered rectangular shape, or an arched shape. Wind break device 20 and microphone 70 overlay an external surface 29, in one embodiment. In another embodiment, wind break device 20 and microphone 70 comprise at least a portion of the external surface 29. The microphone 70 overlays the external surface 29 within the microphone zone 26. In one embodiment, the wind break device 20 is a protrusion for the external surface 29. In another embodiment, there is no external surface 29 in acoustic reception system 10.

The recirculation zone 25 includes a volume of space located between the edge 38A and reattachment zone 24 and above the external surface 29. The microphone zone 26 is located within the recirculation zone 25. The microphone 70 is located in the microphone zone 26. Curved dashed line 14 indicates the edge of the microphone zone 26 Curved dashed line 15 indicates the separation of the recirculation zone 25 from the reattachment zone 24 on the external surface 29.

The curved dashed line 16 is at the end of the reattachment zone 24 on the external surface 29. The reattachment zone 24 includes a volume of space located above the external surface 29 and between the recirculation zone 25 and where the flow is again attached to the external surface 29 after the curved dashed line 16.

The airflow 40 separates from either the airflow diverter 32 or the flow separation edge 34. The separated airflow is directed as one of recirculating airflow 42 (FIG. 1C) or a major airflow 43 (FIG. 1C). The major airflow 43 includes the majority of the separated airflow. The recirculating airflow 42 is the portion of separated airflow that is not included in the major airflow 43. The major airflow 43 is directed over the microphone zone 26 and the recirculation zone 25. The recirculating airflow 42 is directed into the recirculation zone 25 and is driven in a circular flow within the recirculation zone 25 by the major airflow 43 that contacts the adjacent region of the recirculating airflow 42. At least a portion of the major airflow 43 flows into the reattachment zone 24.

In this manner, the airflow diverter 32 reduces the level of pressure fluctuations experienced by the microphone 70 in the microphone zone 26 by directing the major airflow 43 over the microphone zone 26 and the recirculation zone 25. The level of pressure fluctuations experienced by the microphone 70 in the microphone zone 26 is reduced from the level of pressure fluctuations experienced by the microphone 70 when the microphone 70 is not in the microphone zone 26 of the wind break device 20.

Airflow 40 may be mechanically or naturally generated, such as from a blower fan from a defroster in an automobile, a heating, ventilation and air conditioning system, an open window of a moving vehicle, or an open roof of a convertible. Pressure fluctuations travel with the airflow 40 and can interact with microphone 70 to generate a high audio noise signal that can swamp or diminish acoustic signals from, for example, a users voice. Acoustic sound 44 generated, for example, from a driver or a passenger in vehicle is detected by microphone 70 with increased clarity due to diminished pressure fluctuation from airflow 40. Airflow 40 separates from airflow diverter 32 or flow separation edge 34 to reduce audio noise signal produced by pressure fluctuations in airflow 40 on the microphone 70.

In one embodiment, the outer surface 36 of the wind break device 20 is not contoured but is a flat surface that may or may not be parallel to the external surface 29. In another embodiment, the wind break device 20 includes a relatively hard material with no perforations, openings or apertures before flow separation edge 34. The material of wind break device 20 may be textured or smooth.

Wind break device 20 has a mating surface 37 (FIGS. 1A and 1C) for positioning wind break device 20 adjacent to the external surface 29. In one embodiment, the external surface 29 is a vehicle surface and the acoustic reception system 10 is for a mobile vehicle. In that case, wind break device 20 and microphone 70 may be positioned on a dash, console, steering wheel, or rearview mirror of vehicle. Wind break device 20 and microphone 70 may be flush with, or protrude from the external surface 29. One or more wind break devices 20 and microphones 70 may be positioned within a vehicle to aid, for example, in hands-free communication using a cell phone, an in-vehicle telematics unit with advisor services, an in-vehicle entertainment system, or an in-vehicle voice recognition system. In another embodiment, the wind break device 20 does not have a mating surface 37 and is part of the external surface 29.

Depending on flow velocity and other factors, airflow 40 transiting the front end of wind break device 20 may separate from airflow diverter 32 at points somewhere across outer surface 36. Alternatively, flow separation may occur at flow separation edge 34 if separation has not occurred earlier. Flow separation generate vortices in the recirculation zone 25 that produces pressure fluctuations that are significantly smaller that what is found in airflow 40. Pressure fluctuations experienced by microphone 70 are thereby reduced from the level of pressure fluctuations experienced by the microphone 70 if the microphone 70 is not in the microphone zone 26 of the wind break device 20.

Figure 2A:
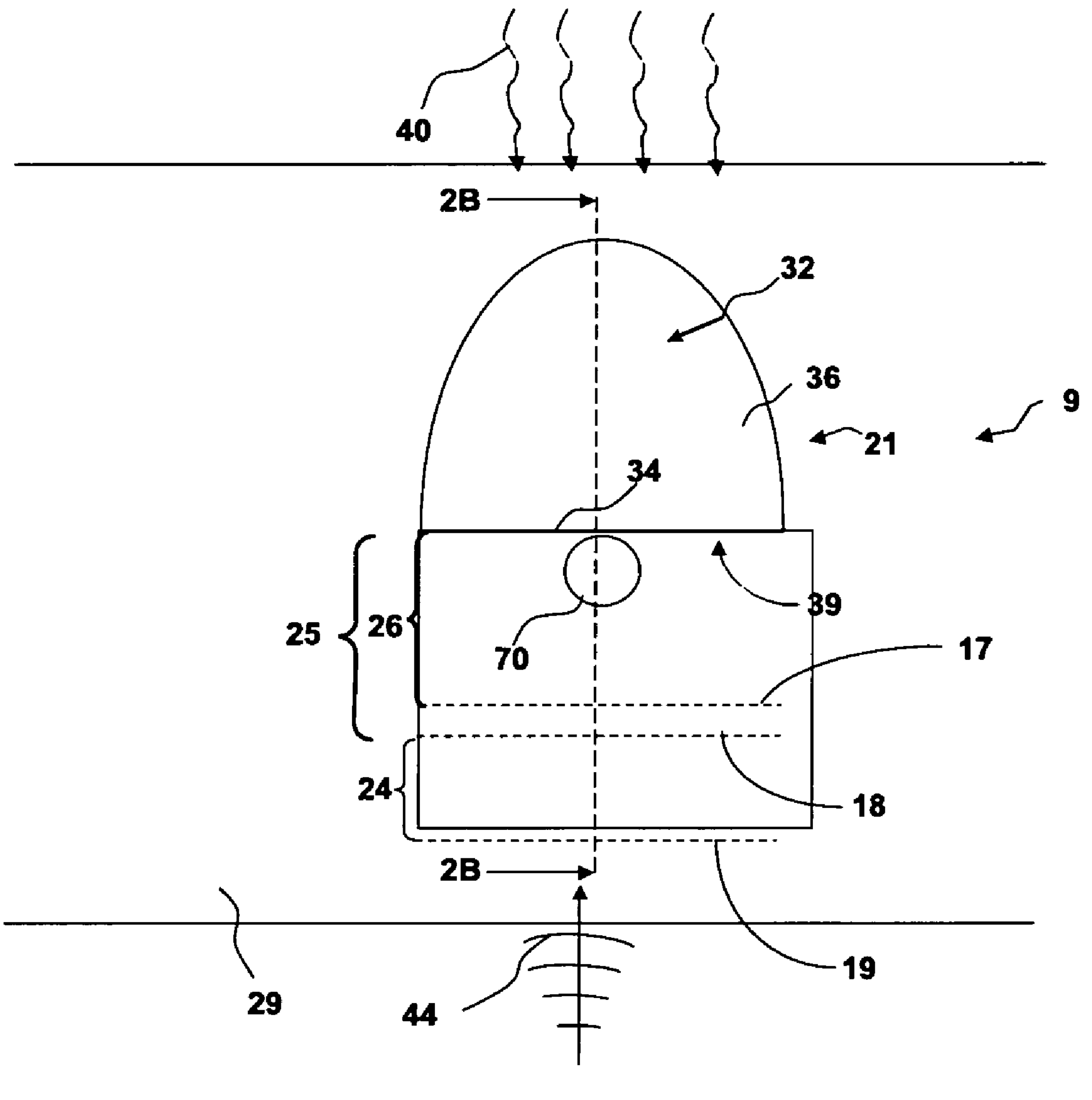
FIG. 2A illustrates a top view of the wind break for a microphone, in accordance with a second embodiment of the invention.

FIG. 2 illustrates a top view of the wind break device 21 for a microphone 70, in accordance with a second embodiment of the invention. An acoustic reception system 9 includes a microphone 70 and a wind break device 21 for the microphone 70. The wind break device 21 has an airflow diverter 32 and a flow separation edge 34. The flow separation edge 34 is positioned downstream of the wind break device 21. The second embodiment differs from the first embodiment in that the front face 39 of wind break device 21 is flat.

The body portion of wind break device 21 includes a contoured surface 36 having a flow separation edge 34, a lower surface 29 offset from the contoured surface 36 by a height H (FIG. 2B) and a front face 39 bordered by the flow separation edge 34 and bordered at a second edge 39A by the lower surface 29. The recirculation zone 25 includes a volume of space located between the edge 39A and reattachment zone 24 and above the external surface 29. The microphone zone 26 is located within the recirculation zone 25. The microphone 70 is located in the microphone zone 26. Straight dashed line 17 indicates the edge of the microphone zone 26.

Straight dashed line 18 indicates the separation of the recirculation zone 25 from the reattachment zone 24 on the external surface 29. The reattachment zone 24 includes a volume of space located above the external surface 29 and between the recirculation zone 25 and where the flow is again attached to the external surface 29 after the straight dashed line 19.

Figure 2B:
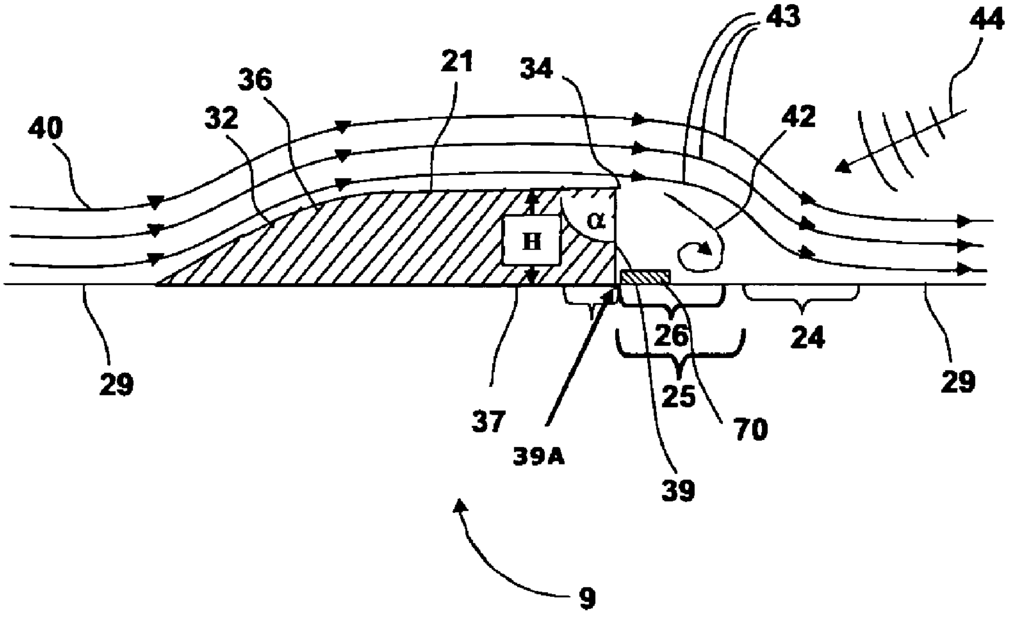
FIG. 2B shows a cross-sectional side view of airflow over the wind break for a microphone, in accordance with the second embodiment of the invention.

Wind break device 21 functions in a similar manner as the wind break device 20 described above with reference to FIGS. 1A, 1B and 1C. FIG. 2B shows a cross-sectional side view of airflow 40 over the wind break device 21 for a microphone 70, in accordance with the second embodiment of the invention. The plane upon which the cross-section view of FIG. 2B is taken is indicated by section line 2B-2B in FIG. 2B.

The airflow 40 separates from either the airflow diverter 32 or the flow separation edge 34 and is directed as one of recirculating airflow 42 (FIG. 2B) or a major airflow 43 (FIG. 2B). The directing of the airflow 40 reduces the level of pressure fluctuations experienced by the microphone 70 in the microphone zone 26.

Figure 3:
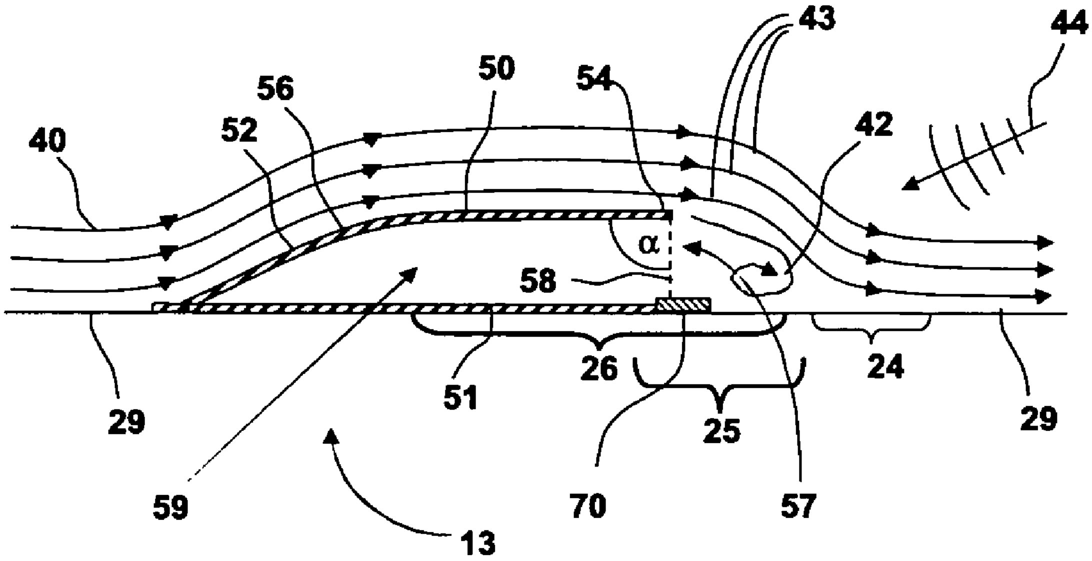
FIG. 3 shows a cross-sectional side view of airflow over the wind break for a microphone, in accordance with a third embodiment of the invention.

FIG. 3 shows a cross-sectional side view of airflow 40 over the wind break device 50 for a microphone 70, in accordance with a third embodiment of the invention. An acoustic reception system 13 includes a microphone 70 and a wind break device 50 for the microphone 70. The wind break device 50 has an airflow diverter 52 and a flow separation edge 54. The flow separation edge 54 is positioned downstream of the wind break device 50. Wind break device 50 can be used in the acoustic reception system 13 for a microphone 70 in a similar manner that a wind break device 20 was used in the acoustic reception system 10 for a microphone 70 as described above with reference to FIGS. 1A, 1B and 1C. In this embodiment, the wind break device defines an open space rather than solid and the region in which front face 38 was located is open.

Wind break device 50 for a microphone 70 is a shell defining an interior space 59 that includes contoured outer surface 56 and a port opening 57. Contoured outer surface 56 directs airflow 40 away from microphone 70. Port opening 57 as shown in FIG. 3 partially borders the flow separation edge 54 and the lower surface 29. Flow separation edge 54 is positioned downstream of airflow diverter 52.

In FIG. 3, port opening 57 defines a port plane 58. Port plane 58 can be flat, as was front face 39 in FIGS. 2A and 2B or curved, as was front face 38 in FIGS. 1A, 1B and 1C. Wind break device 50 has an airflow diverter 52 and a flow separation edge 54 at the port plane 58 of the airflow diverter 50. The airflow 40 separates from one of the airflow diverter 52 or the flow separation edge 54. Pressure fluctuations experienced by microphone 70 are thereby reduced as described above with reference to FIGS. 1A, 1B and 1C.

As shown in FIG. 3, the airflow 40 separates from the flow separation edge 54 and/or the airflow diverter 52 as either major airflow 43 or recirculating airflow 42. Major airflow 43 is directed over the recirculation zone 25. The microphone zone 26 partially includes the recirculation zone 25 and partially includes the interior space 59. The recirculating airflow 42 is directed into the recirculation zone 25 and is driven in a circular flow within the recirculation zone 25 by the major airflow 43 that contacts the adjacent region of the recirculating airflow 42. At least a portion of the major airflow 43 flows into the reattachment zone 24.

Contoured outer surface 56 includes a variety of radii and the radii of the contoured outer surface 56 extends from the end upon which the airflow 40 is incident to the port opening 57. Contoured outer surface 56 may have a variety of shapes such as a cone shape, a half-cone shape, a wedge shape, a tapered rectangular shape, or an arched shape.

In one embodiment, wind break device 50 includes a relatively hard material with no perforations, openings or apertures before flow separation edge 54. The material of wind break device 50 may be textured or smooth.

In another embodiment, wind break device 50 has a mating surface 51 for positioning wind break device 20 adjacent to an external surface 29. In yet another embodiment, the external surface 29 is a vehicle surface and the acoustic reception system 10 is for a vehicle. Wind break device 50 and microphone 70 may be flush with, or protrude from the external surface 29. In yet another embodiment, the mating surface 51 is a lip along an edge of the airflow diverter 52 and the lip provides a mating surface to the external surface 29.

Figure 4:
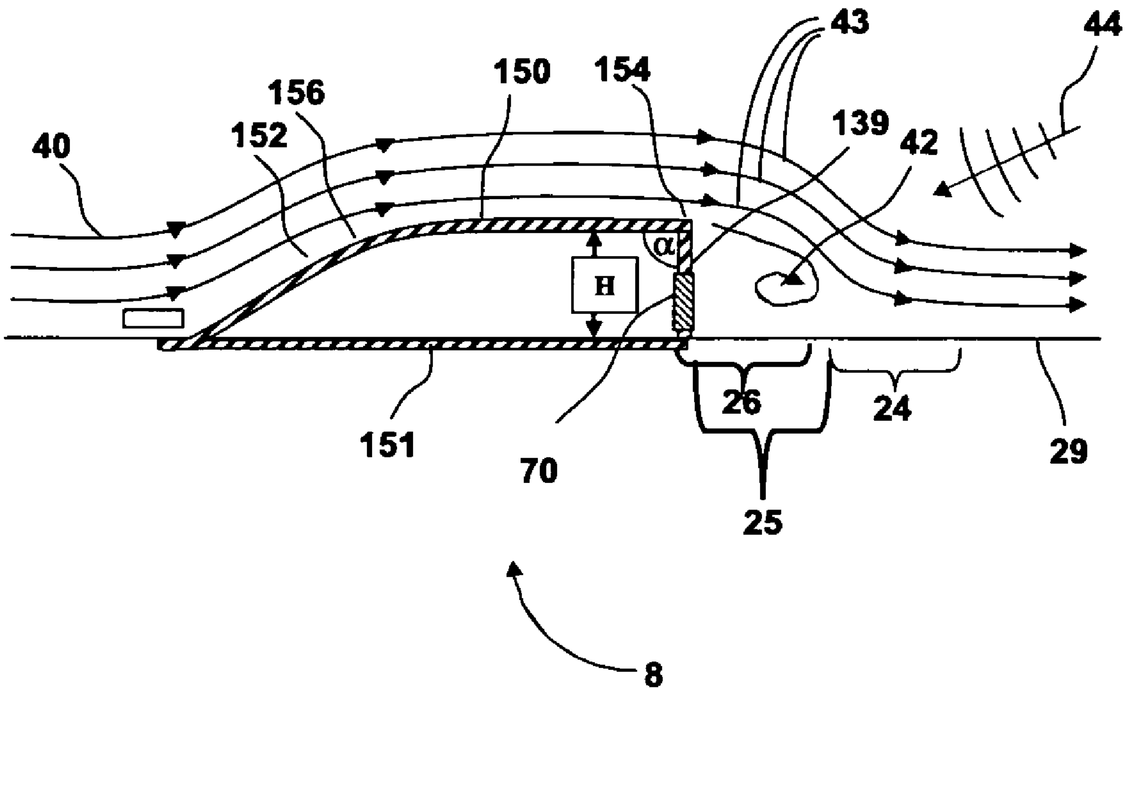
FIG. 4 shows a cross-sectional side view of airflow over the wind break for a microphone, in accordance with a fourth embodiment of the invention.

FIG. 4 shows a cross-sectional side view of airflow 40 over the wind break device 150 for a microphone 70, in accordance with a fourth embodiment of the invention. An acoustic reception system 8 includes a microphone 70 and a wind break device 150 for the microphone 70. The wind break device 150 has an airflow diverter 152 and a flow separation edge 154. The flow separation edge 154 is positioned downstream of the wind break device 150. Wind break device 150 can be used in the acoustic reception system 8 for a microphone 70 in a similar manner as the wind break device 20 was used in the acoustic reception system 10 for a microphone 70 as described above with reference to FIGS. 1A, 1B and 1C. In this embodiment, the wind break device is a shell defining an open space with a solid front face 139.

Wind break device 150 for a microphone 70 is a shell defining an open space that includes contoured outer surface 156 and a front face 139. Contoured outer surface 156 directs airflow 40 away from microphone 70. Front face 139 is in the microphone zone 26.

In one embodiment, the front face 139 of wind break device 150 is flat. In another embodiment, the front face 139 of wind break device 150 is curved in a concave direction in a manner similar to the curve of front face 38, as described above with reference to FIGS. 1A, 1B and 1C. The front face 139 includes the microphone 70.

Wind break device 150 has an airflow diverter 152 and a flow separation edge 154 at the front face 139 of the airflow diverter 150. The airflow 40 separates from one of the airflow diverter 152 or the flow separation edge 154.

Depending on flow velocity and other factors, airflow 40 transiting a front end of wind break device 150 may separate from airflow diverter 152 at points somewhere across outer surface 156. Alternatively, flow separation may occur at flow separation edge 154 if separation has not occurred earlier. Flow separation edge 154 can form a line of flow separation that generates recirculating flow 42 in the recirculation zone 25 to reduce the level and effect of the pressure fluctuations experienced by the microphone 70 from the airflow 40.

Contoured outer surface 156 includes a variety of radii and the radii of the contoured outer surface 156 extends from the end upon which the airflow 40 is incident to the front face 139. Contoured outer surface 156 may have a variety of shapes as described above with reference to contoured outer surface 36 of FIGS. 1A, 1B and 1C. In one embodiment, wind break device 150 includes a relatively hard material with no perforations, openings or apertures before flow separation edge 154. The material of wind break device 150 may be textured or smooth.

Wind break device 150 has no mating surface, in one embodiment. In one embodiment, wind break device 150 has a mating surface 151 in the form of a lip around the bottom perimeter of the wind break device 150. In this case, wind break device 150 mates with an external surface, such as a vehicle surface, and the acoustic reception system 8 is for a vehicle. Wind break device 150 and microphone 70 may be inset, flush with, or protrude from front face 139.

Figure 5A:
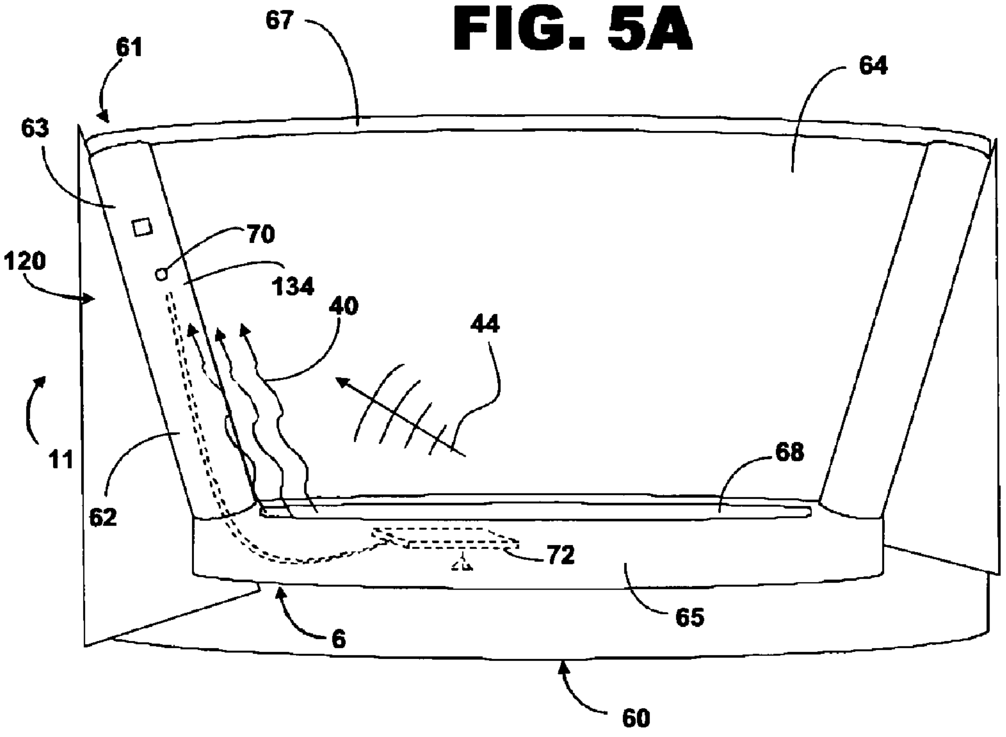
FIG. 5A illustrates an acoustic system for a mobile vehicle, in accordance with a fifth embodiment of the invention.
Figure 5B:
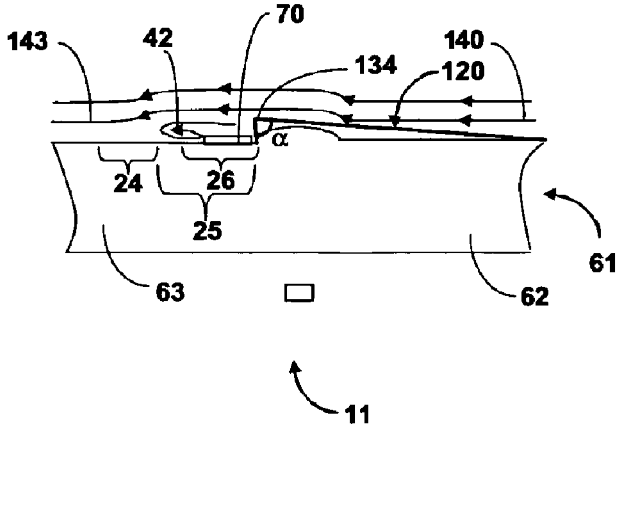
FIG. 5B illustrates an enlarged detailed cross sectional view of the microphone and wind break device in the acoustic reception system of FIG. 5A.

FIG. 5A illustrates an acoustic system 6 for a vehicle 60, in accordance with a fifth embodiment of the invention. Acoustic system 6 for a vehicle 60 includes acoustic reception system 11 and in-vehicle communication device 72 electrically connected to microphone 70. The acoustic reception system 11 includes wind break device 120 and microphone 70. FIG. 5B illustrates an enlarged detailed cross sectional view of acoustic reception system 11 of FIG. 5A.

The wind break device 120 is a contoured outer surface which functions in the manner of airflow diverter 32 of wind break device 20 described above with reference to FIGS. 1A-1C. The flow separation edge 134 delineates the windward side 140 from the lee side 143 of the wind break device 120. In the acoustic reception system 11, the microphone 70 is positioned to the lee of the wind break device 120 in the microphone region 26 so the wind break device 120 diverts airflow 40 from the microphone 70.

The microphone 70 and the wind break device 120 can be positioned on any surface, such as a vehicle dashboard 65 or a roof rail 67. As illustrated in FIGS. 5A and 5B, the microphone 70 and the wind break device 120 are located on an A-pillar 61. The wind break device 120 is raised above the surface of the A-pillar 61 that demarks an upper pillar region 63 from a lower pillar region 62. The A-pillar 61 is a vehicle structure that is connected to the vehicle dashboard 65 at one end of the lower pillar region 62 and is connected to the roof rail 67 at one end of the upper pillar region 63. The A-pillar 61 borders one edge of the windshield 64. The wind break device 120 extends across the A-pillar 61. In one embodiment, the wind break device 120 partially extends across a portion of the A-pillar 61 in the region bordering the microphone zone 26 (FIG. 5B).

Microphone 70 is electrically connected to an in-vehicle communication device 72 through, for example, a cable, a wire harness, an in-vehicle network, or a vehicle bus. Examples of in-vehicle communication devices include a cell phone, a telematics unit, an entertainment system, and a voice-recognition system.

The airflow 40 from an air conditioning/defroster vent 68 may impinge upon the wind break device 120. Wind break device 120 functions in a similar manner as the wind break device 20 as described above with reference to FIGS. 1A, 1B and 1C. Acoustic sound 44 generated, for example, from a driver or a passenger in vehicle 60 is detected by microphone 70 with increased clarity due to diminished pressure fluctuation from airflow 40.

Figure 6:
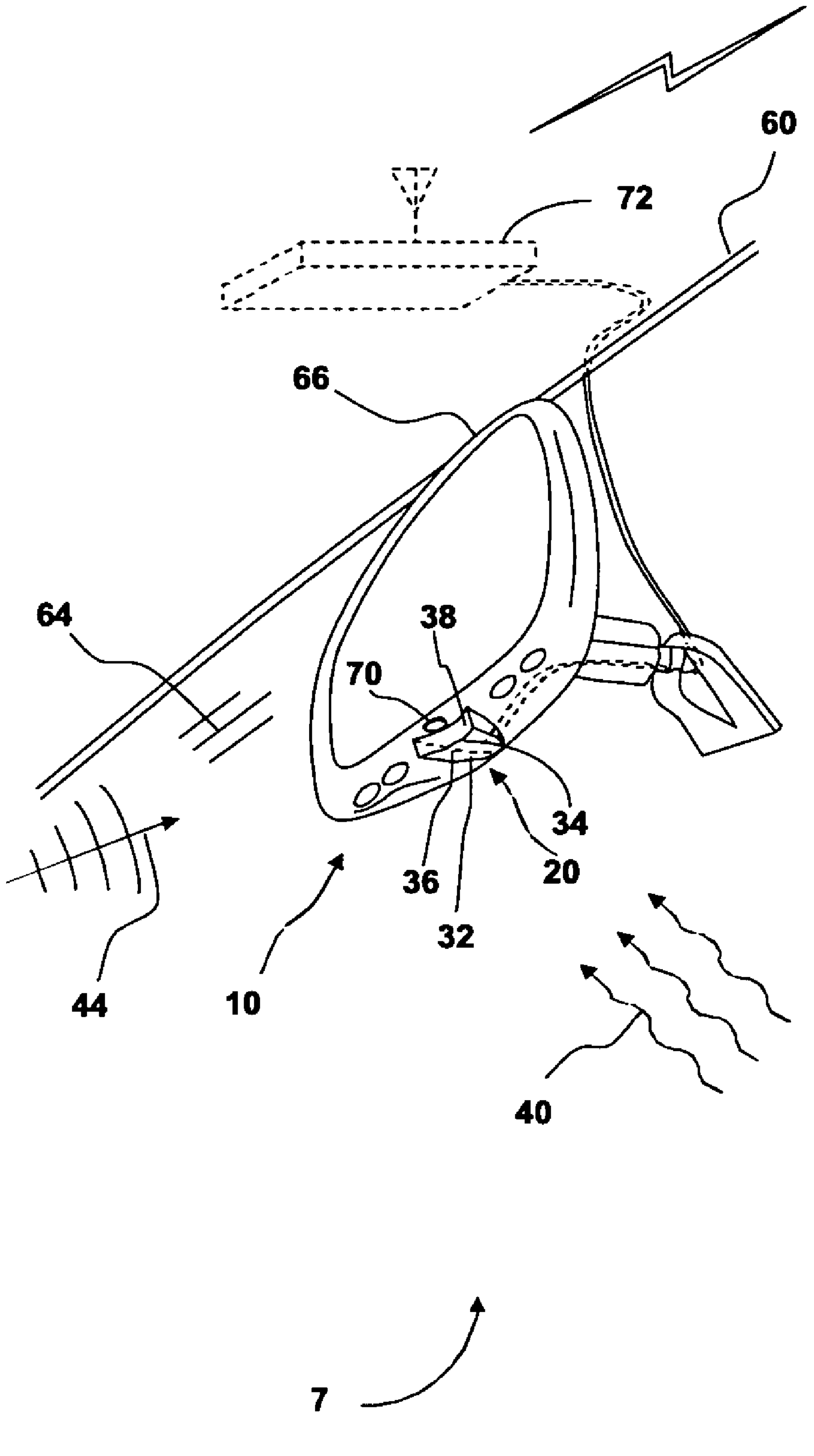
FIG. 6 illustrates an acoustic system for a mobile vehicle, in accordance with the first embodiment of the invention.

FIG. 6 illustrates an acoustic system 7 for a vehicle 60 accordance with the first embodiment of the present invention. Acoustic system 7 for a mobile vehicle 60 includes acoustic reception system 10 as described above with reference to FIGS. 1A, 1B, and 1C and in-vehicle communication device 72 electrically connected to microphone 70. As shown in FIG. 6, the wind break device is the wind break device 20, but the wind break device can be other embodiments, such as wind break devices 21, 50, 150 or 120.

As illustrated, wind break device 20 and microphone 70 are positioned in a rearview mirror 66 attached to a windshield 64 of vehicle 60. Microphone 70 is electrically connected to in-vehicle communication device 72 through, for example, a cable, a wire harness, an in-vehicle network, or a vehicle bus. Examples of in-vehicle communication devices 72 include a cell phone, a telematics unit, an entertainment system, and a voice-recognition system. Although shown connected to rearview mirror 66, one or more microphones 70 with wind break devices 20 may be connected to a steering wheel, a steering column, a dash, an entertainment console, an overhead console, a vehicle ceiling, a roof rail, an a-pillar in the vehicle, an in-vehicle console, other in-vehicle locations or combinations thereof. As used herein, the term telematics unit means any communication device configured to send and receive communications to and from a call center configured to provide services to a driver of the vehicle.

An airflow 40 such as from a defroster may impinge upon microphone 70. A wind break device 20 with an airflow diverter 32 and a flow separation edge 34 direct airflow 40 away from microphone 70 as described above with reference to FIGS. 1A and 1B. Airflow diverter 32 may include a contoured outer surface 36 to direct airflow 40. For example, flow separation edge 34 generates recirculating flow in recirculation zone 25 to reduce the level of pressure fluctuations experienced by the microphone 70 from the airflow 40.

Acoustic reception system 10 includes the front face 38 at least partially bordered by flow separation edge 34. Front face 38 is positioned downstream of airflow 40. Acoustic sound 44 generated, for example, from a driver or a passenger in vehicle 60 is detected by microphone 70 with increased clarity due to diminished pressure fluctuations from airflow 40. In one embodiment, the wind break device 20 reduces the level of pressure fluctuations experienced by the microphone 70 from the airflow 40 as described above with reference to FIGS. 1A and 1B. In another embodiment, the wind break device 50 is a shell defining an open space and reduces the level of pressure experienced by the microphone 70 from the airflow 40 as described above with reference to FIG. 3.

Figure 7:
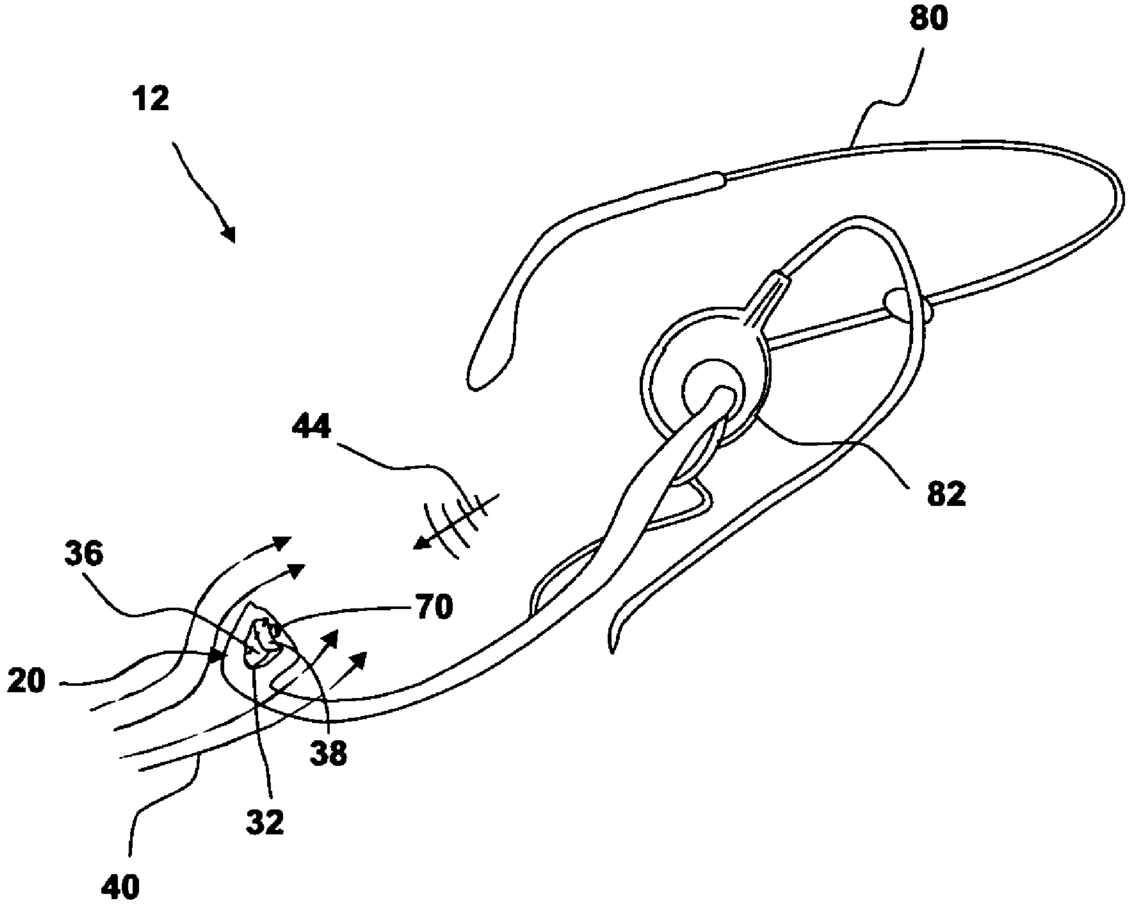
FIG. 7 illustrates a hands-free communication device, in accordance with the first embodiment of the invention.

FIG. 7 illustrates a hands-free communication device, in accordance with one embodiment of the present invention. A hands-free communication device 12 includes a headset 80 having at least one earphone 82 and a microphone 70 and a wind break device 20 having an airflow diverter 32 and a flow separation edge 34. In one embodiment, the hands-free communication device includes a headset 80 having at least one earphone 82, a microphone 70 and a wind break device 20. In another embodiment, the hands-free communication device includes a headset 80 having at least one earphone 82, a microphone 70 and a wind break device 50.

Wind break device 20 operates as described above with reference to FIGS. 1 and 2 to direct airflow 40 originating from, for example, an air conditioning system within a vehicle, an open window, or the air through which a rider travels on a bicycle or motorcycle. The directed airflow 40 reduces pressure fluctuations experienced by the microphone 70, as described above with reference to FIGS. 1-3.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A wind break device for a microphone, the wind break device comprising: an airflow diverter; and a flow separation edge partially bordering a microphone end of the airflow diverter, wherein the microphone is located in a microphone zone located between the flow separation edge and a reattachment zone, wherein airflow separates from one of the airflow diverter or the flow separation edge, wherein the separated airflow is directed as one of a recirculating airflow or a major airflow, wherein the recirculating airflow is directed into a recirculation zone, and wherein the major airflow is directed over the microphone zone and the recirculation zone.

2. The wind break device of claim 1, wherein at least a portion of the major airflow is directed into a reattachment zone and wherein the recirculation zone is located between the reattachment zone and the flow separation edge.

3. The wind break device of claim 2, wherein the microphone zone and the recirculation zone at least partially overlap.

4. The wind break device of claim 1, wherein the flow separation edge is positioned downstream of the wind break device.

5. The wind break device of claim 1, wherein the wind break device further comprises: a contoured outer surface to direct the airflow; and a front face at least partially bordered by the flow separation edge, the front face bordering the microphone zone and recirculating zone.

6. The windbreak device of claim 1, wherein the wind break device further comprises a front face, and wherein the microphone is located in the front face.

7. The wind break device of claim 1, wherein the wind break device is a shell including: a contoured outer surface to direct the separated airflow.

8. The wind break device of claim 7, wherein the shell further includes a port opening bordering the microphone zone and at least partially bordered by the flow separation edge.

9. The wind break device of claim 1, wherein the wind break device further comprises a mating surface for positioning the wind break adjacent to an external surface.

10. The wind break device of claim 9, wherein the external surface is a vehicle surface.

11. The wind break device of claim 9, and wherein the recirculation zone is located between a reattachment zone and the microphone zone, wherein the recirculating airflow directed into the recirculation zone does not contact the external surface and wherein the major airflow is directed to contact the external surface in the reattachment zone.

12. An acoustic system for a vehicle, the system comprising: a microphone connected to an in-vehicle communication device; and a wind break device having an airflow diverter and a flow separation edge, the flow separation edge bordering a recirculation zone of the airflow diverter, wherein the microphone is inside a microphone zone that is located behind the flow separation edge and inside the recirculation zone, wherein airflow separates from one of the airflow diverter or the flow separation edge, wherein the separated airflow is directed as one of a recirculating airflow or a major airflow, wherein the recirculating airflow is directed into the recirculation zone, and wherein the major airflow is directed over the microphone zone and the recirculation zone to reduce the level of pressure fluctuations experienced by the microphone in the microphone zone.

13. The system of claim 12, including means to direct at least a portion of the major airflow into a reattachment zone, wherein the recirculation zone is located between the reattachment zone and the flow separation edge.

14. The system of claim 12, wherein the in-vehicle communication device includes one of a cell phone, a telematics unit, an entertainment system, or a voice-recognition system.

15. The system of claim 12, wherein the microphone and the wind break device are connected to one of a group consisting of a rearview mirror, a steering wheel, a steering column, a vehicle dashboard, an entertainment console, an overhead console, a vehicle ceiling, a roof rail, an a-pillar in the vehicle, an in-vehicle console, an in-vehicle location, and combinations thereof.

16. The system of claim 12, wherein the wind break device further comprises: a contoured outer surface to direct the flow of air away from the microphone; and a front face at least partially bordered by the flow separation edge, the front face bordering the microphone zone and recirculating zone.

17. The system of claim 12, wherein the wind break device is a shell including: a contoured outer surface to direct the airflow away from the microphone; and a port opening, the port opening bordering the microphone zone and at least partially bordered by the flow separation edge.

18. The system of claim 12, wherein the wind break device further comprises a front face, and wherein the microphone is located in the front face.

19. A hands-free communication device, comprising: a headset including at least one earphone and a microphone; and a wind break device having an airflow diverter and a flow separation edge, the flow separation edge partially bordering a microphone end of the airflow diverter, a microphone zone that is located behind the flow separation edge and is partially contained in a recirculation zone, wherein the microphone is located in the microphone zone, and wherein the flow separation edge generates recirculating flow in the recirculation zone to reduce the level of pressure fluctuations experienced by the microphone in the microphone zone.

* * * * *